United States Patent
Lindholm et al.

(10) Patent No.: US 9,442,755 B2
(45) Date of Patent: Sep. 13, 2016

(54) SYSTEM AND METHOD FOR HARDWARE SCHEDULING OF INDEXED BARRIERS

(71) Applicant: NVIDIA Corporation, Santa Clara, CA (US)

(72) Inventors: John Erik Lindholm, Saratoga, CA (US); Tero Tapani Karras, Helsinki (FI)

(73) Assignee: NVIDIA Corporation, Santa Clara, CA (US)

(*) Notice: Subject to any disclaimer, the term of this patent is extended or adjusted under 35 U.S.C. 154(b) by 657 days.

(21) Appl. No.: 13/844,541

(22) Filed: Mar. 15, 2013

(65) Prior Publication Data

US 2014/0282566 A1 Sep. 18, 2014

(51) Int. Cl.
- G06F 9/30 (2006.01)
- G06F 9/46 (2006.01)
- G06F 9/52 (2006.01)
- G06F 9/38 (2006.01)

(52) U.S. Cl.
CPC ............ *G06F 9/46* (2013.01); *G06F 9/30087* (2013.01); *G06F 9/3834* (2013.01); *G06F 9/3851* (2013.01); *G06F 9/522* (2013.01)

(58) Field of Classification Search
CPC .... G06F 9/46; G06F 9/30087; G06F 9/3834; G06F 9/3851; G06F 9/522; G06F 9/30
See application file for complete search history.

(56) References Cited

U.S. PATENT DOCUMENTS

| | | | |
|---|---|---|---|
| 7,669,203 B2* | 2/2010 | Samra | G06F 9/3851 712/233 |
| 8,209,702 B1* | 6/2012 | Roytman | G06F 9/5027 718/106 |
| 2007/0113232 A1 | 5/2007 | Collard et al. | |
| 2008/0256330 A1 | 10/2008 | Wang et al. | |
| 2010/0153761 A1 | 6/2010 | Nishioka | |
| 2011/0078417 A1* | 3/2011 | Fahs | G06F 9/30145 712/216 |
| 2012/0158886 A1 | 6/2012 | O'Connell et al. | |
| 2014/0123150 A1 | 5/2014 | Lindholm et al. | |
| 2014/0258693 A1 | 9/2014 | Lindholm et al. | |

FOREIGN PATENT DOCUMENTS

TW 201203111 A 1/2012

OTHER PUBLICATIONS

Office Action from Taiwanese Patent Application No. 102142872, dated Nov. 18, 2015.

(Continued)

*Primary Examiner* — Farley Abad
(74) *Attorney, Agent, or Firm* — Zilka-Kotab, PC

(57) ABSTRACT

A method and a system are provided for hardware scheduling of indexed barrier instructions. Execution of a plurality of threads to process instructions of a program that includes a barrier instruction is initiated and when each thread reaches the barrier instruction, the thread pauses execution of the instructions. A first sub-group of threads in the plurality of threads is associated with a first sub-barrier index and a second sub-group of threads in the plurality of threads is associated with a second sub-barrier index. When the barrier instruction can be scheduled for execution, threads in the first sub-group are executed serially and threads in the second sub-group are executed serially and at least one thread in the first sub-group is executed in parallel with at least one thread in the second sub-group.

20 Claims, 13 Drawing Sheets

(56) References Cited

OTHER PUBLICATIONS

Non-Final Office Action from U.S. Appl. No. 13/794,578, dated Oct. 21, 2015.

Notice of Allowance from U.S. Appl. No. 13/794,578, dated May 18, 2016.

\* cited by examiner

SYSTEM AND METHOD FOR HARDWARE SCHEDULING OF INDEXED BARRIERS

This invention was made with Government support under LLNS subcontract B599861 awarded by DOE. The Government has certain rights in this invention.

FIELD OF THE INVENTION

The present invention relates to program execution, and, more specifically to barriers.

BACKGROUND

Conventional parallel processing architectures support the execution of multiple threads. Particular operations that are performed during the execution of a program using a conventional parallel processing architecture may require synchronization of the multiple threads. Barrier instructions (or fence instructions) are used to synchronize the execution of multiple threads during execution of such a program. A scheduling unit within the parallel processing architecture recognizes the barrier instructions and ensures that all of the threads reach a particular barrier instruction before any of the threads executes an instruction subsequent to that particular barrier instruction. The multi-threaded processing unit that executes the threads is configured to synchronize the threads at the particular barrier instruction. The multi-threaded processing unit may be configured to execute the synchronized threads either in parallel or serially. In some cases, all of the synchronized threads may not be executed in parallel, such as when the barrier is used to delineate an ordered critical code section. However, serial execution of the threads reduces performance.

Thus, there is a need for addressing the issue of processing barrier instructions and/or other issues associated with the prior art.

SUMMARY

A system and method are provided for scheduling execution of indexed barrier instructions. Execution of a plurality of threads to process instructions of a program that includes a barrier instruction is initiated and when each thread reaches the barrier instruction, the thread pauses execution of the instructions. A first sub-group of threads in the plurality of threads is associated with a first sub-barrier index and a second sub-group of threads in the plurality of threads is associated with a second sub-barrier index. When the barrier instruction can be scheduled for execution, threads in the first sub-group are executed serially and threads in the second sub-group are executed serially and at least one thread in the first sub-group is executed in parallel with at least one thread in the second sub-group

DETAILED DESCRIPTION

A system and method are provided for scheduling execution of conditional barriers that enable a sub-group of threads to participate in a barrier instruction. Execution of threads to process instructions of a program that includes a barrier instruction is initiated, and when each thread reaches the barrier instruction, it is determined whether the thread participates in the barrier instruction. The threads that participate in the barrier instruction are executed to process one or more instructions of the program that follow the barrier instruction. Threads that do not participate in the barrier instruction may continue execution without waiting for other threads to reach the barrier instruction.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1:
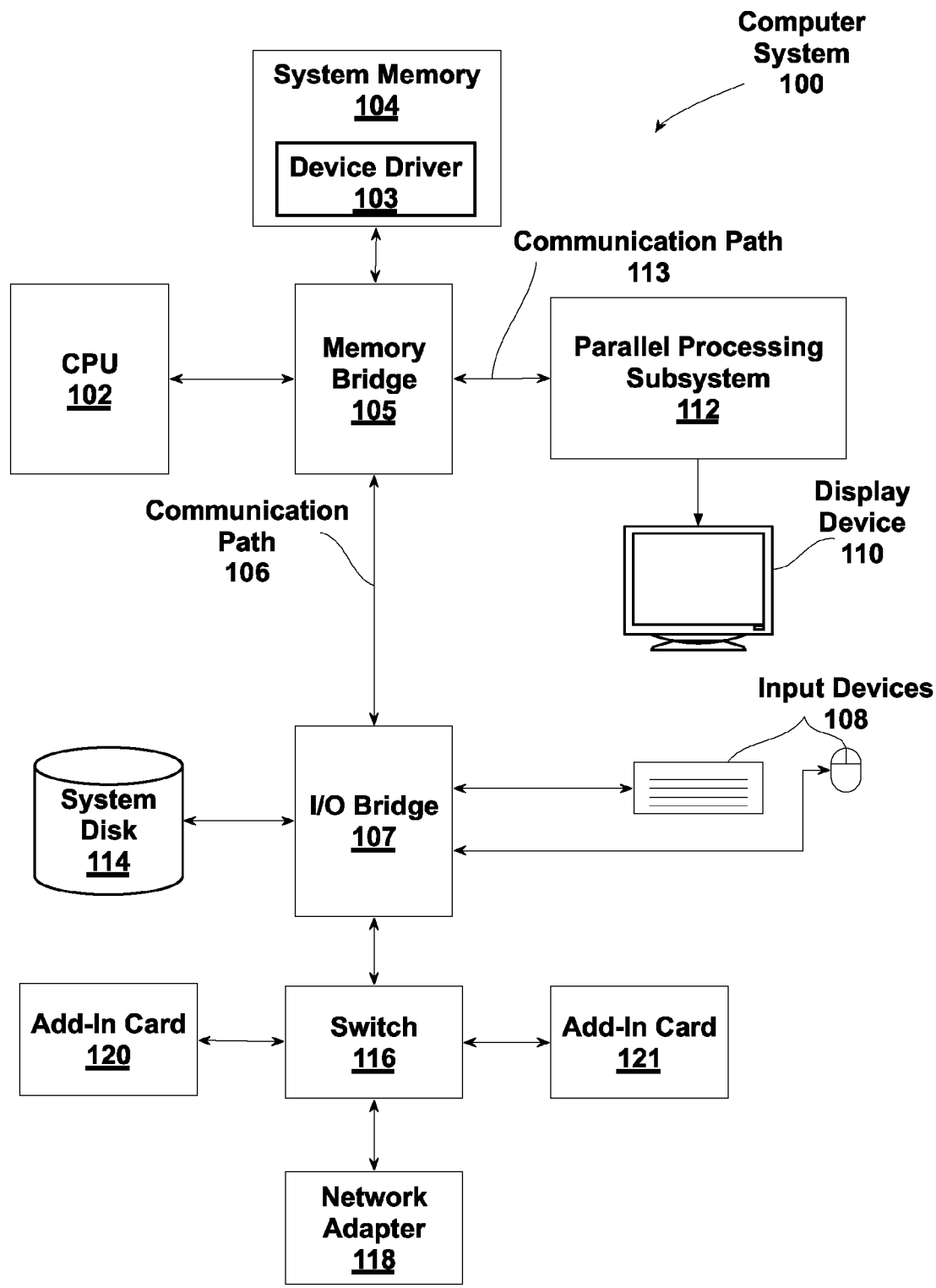
FIG. 1 is a block diagram illustrating a computer system configured to implement one or more aspects of the present disclosure.

FIG. 1 is a block diagram illustrating a computer system 100 configured to implement one or more aspects of the present disclosure. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communications paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
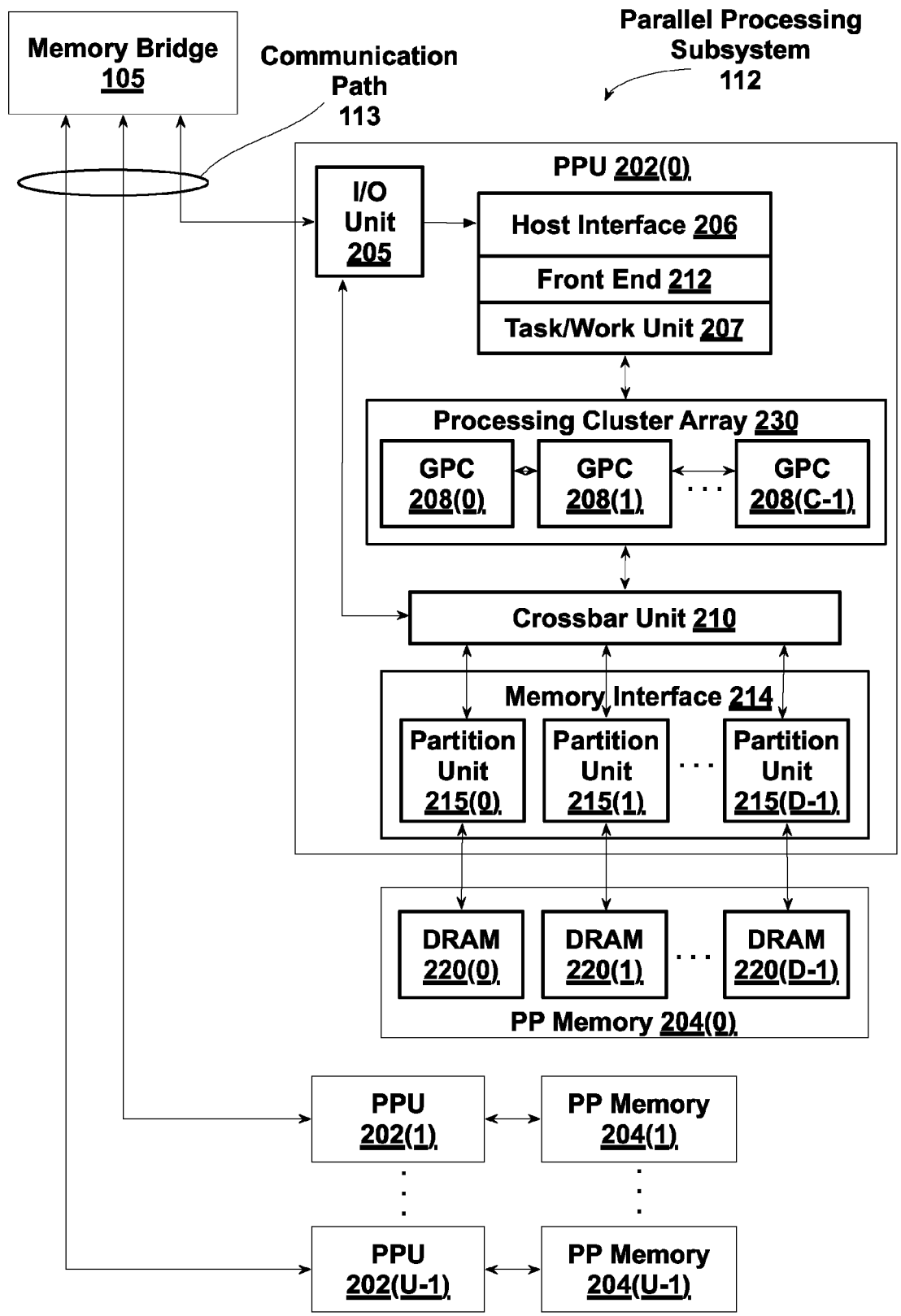
FIG. 2 is a block diagram of a parallel processing subsystem for the computer system of FIG. 1, according to one embodiment of the present disclosure.

FIG. 2 illustrates a parallel processing subsystem 112, according to one embodiment of the present disclosure. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In LIMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
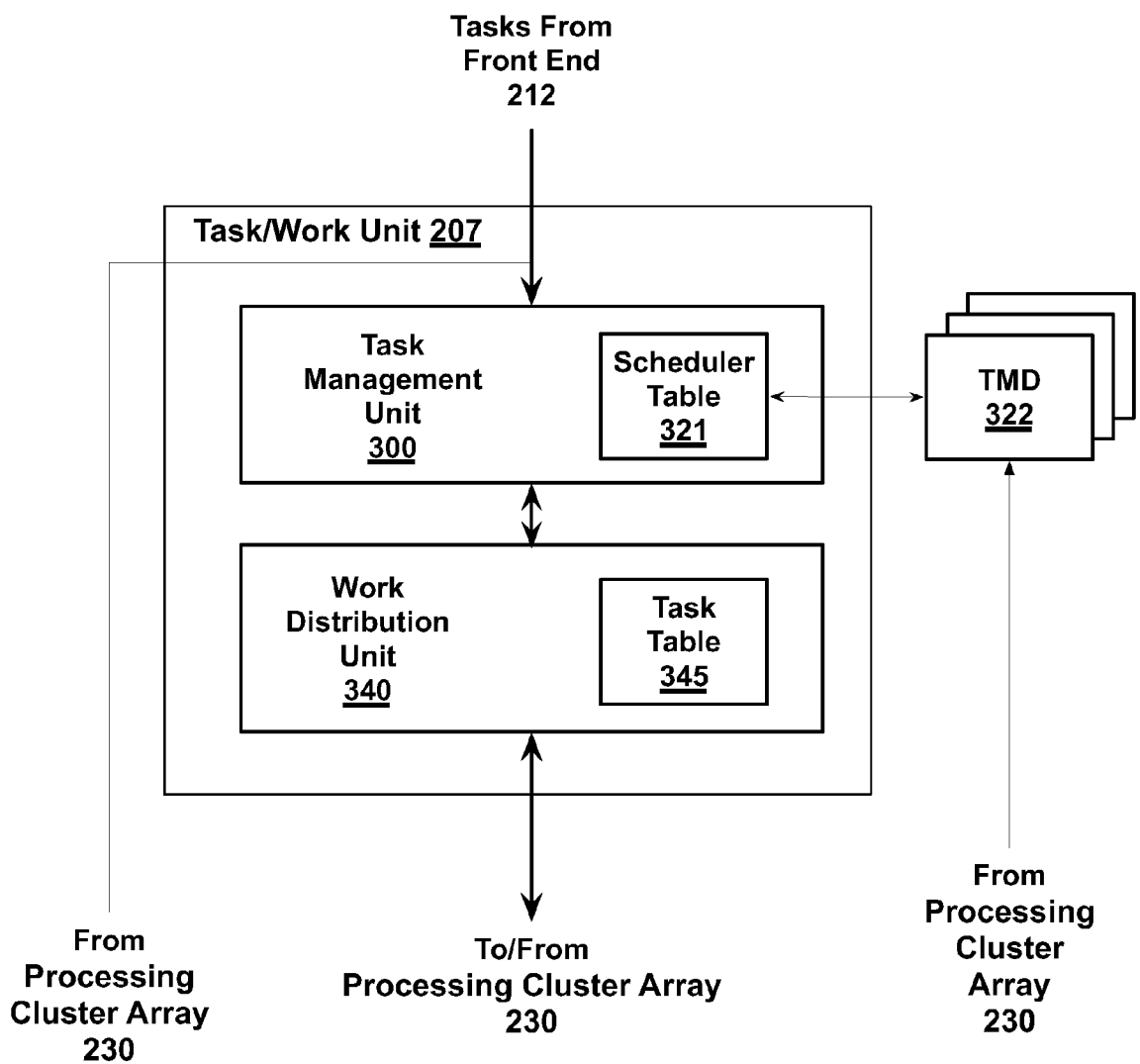
FIG. 3A is a block diagram of the front end of FIG. 2, according to embodiment of the present disclosure.

FIG. 3A is a block diagram of the task/work unit 207 of FIG. 2, according to one embodiment of the present disclosure. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
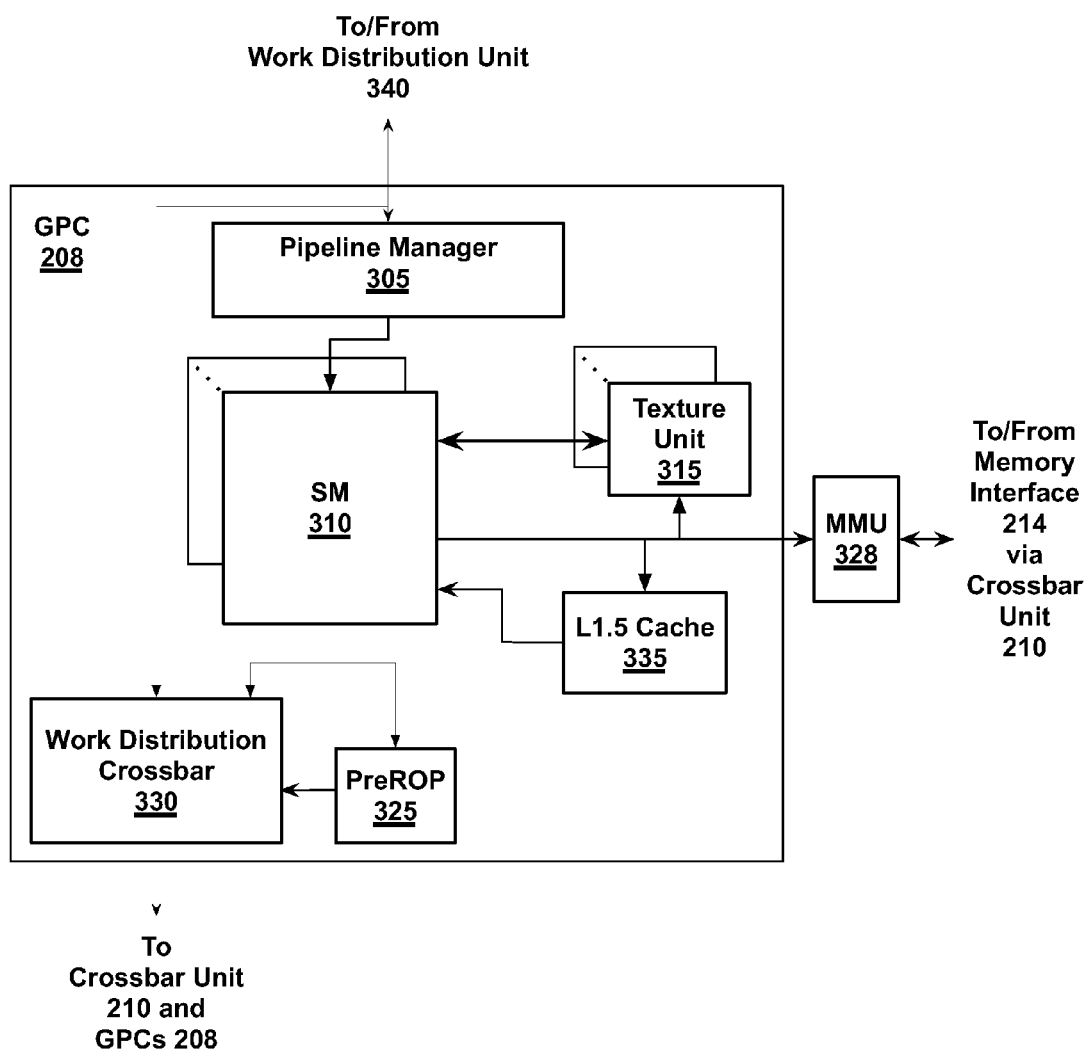
FIG. 3B is a block diagram of a general processing cluster within one of the parallel processing units of FIG. 2, according to one embodiment of the present disclosure.

FIG. 3B is a block diagram of a GPC 208 within one of the PPUs 202 of FIG. 2, according to one embodiment of the present disclosure. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime. Similarly, a SISD (single-instruction single-data) or a MIMD (multiple-instruction multiple-data) regime also represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1 each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 are executed by one or more threads, as previously defined herein, and the collection of a certain number of concurrently executing threads across the parallel processing engines (not shown) within an SM 310 is referred to herein as a "warp" or "thread group." As used herein, a "thread group" refers to a group of one or more threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related warps may be active (in different phases of execution) at the same time within an SM 310. This collection of thread groups is referred to herein as a "cooperative thread array" ("CTA") or "thread array." Each CTA comprises a programmer-specified number of warps executing in the same SM 310. One or more CTAs can potentially execute concurrently in the same SM 310 The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address. The MMU 328 may include address translation lookaside buffers (TLB) or caches which may reside within multiprocessor SM 310 or the L1 cache or GPC 208. The physical address is processed to distribute data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the program; thus, it is to be understood that in a particular application that uses CTAs, the threads of a CTA might or might not actually share data with each other, depending on the program, and the terms "CTA" and "thread array" are used synonymously herein.

Figure 3C:
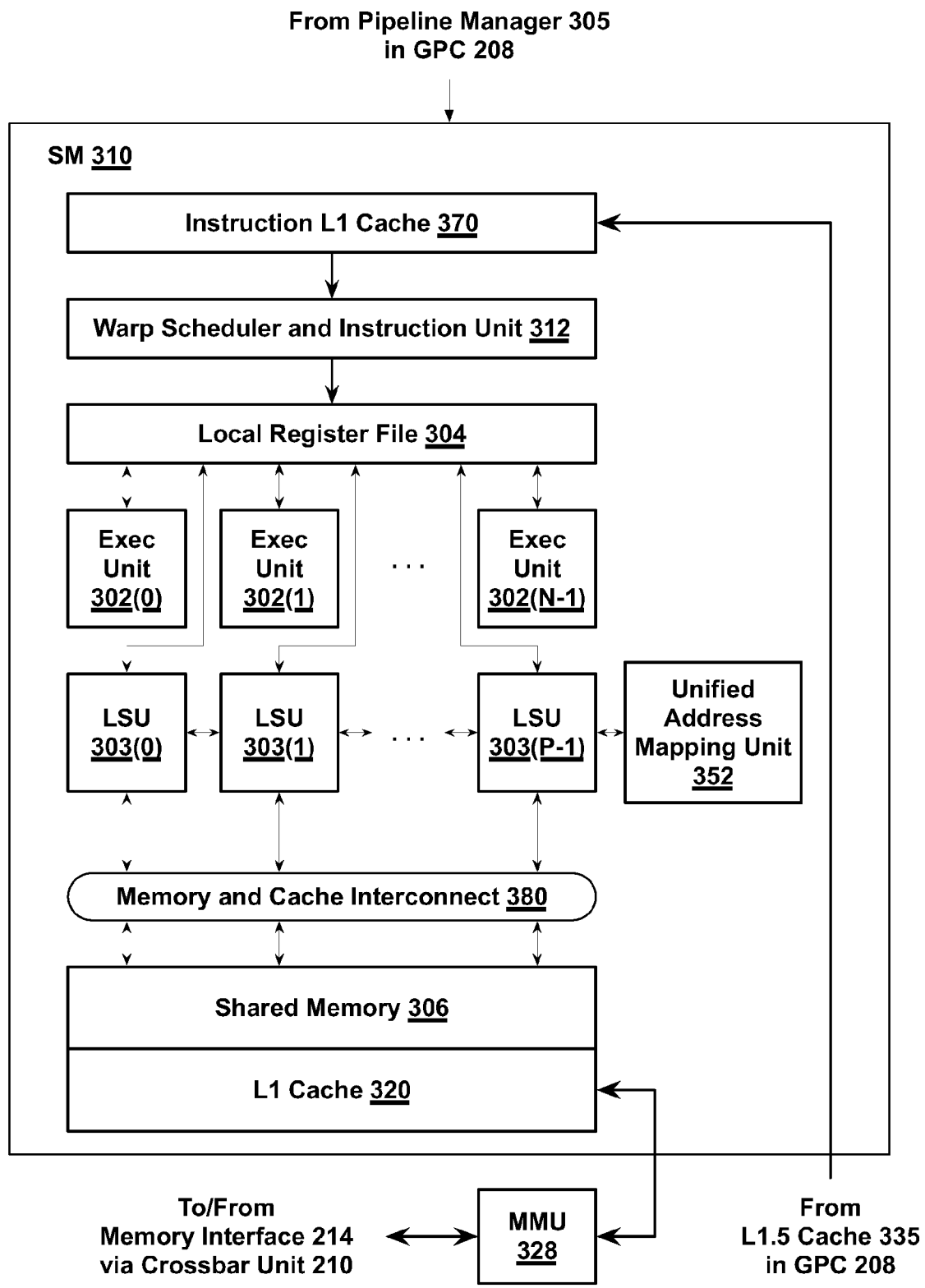
FIG. 3C is a block diagram of a portion of the streaming multiprocessor of FIG. 3B, according to one embodiment of the present disclosure.

FIG. 3C is a block diagram of the SM 310 of FIG. 3B, according to one embodiment of the present disclosure. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310), Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Thread Logical Identifier

An input work buffer that includes multiple work items is assigned to a CTA for processing. The work buffer may include work items for a pixel tile, where each work item corresponds to a particular region of the pixel tile. A number of threads equal to the number of work items in the work buffer are attached to the "parent" CTA. If there is an excess of work items, then only a subset of available work items may be attached to the "parent" CTA. A logical identifier that is relative to the parent CTA is assigned to each thread and the logical identifiers increment in sequence so that the logical identifiers indicate the order in which the threads are launched. The logical identifiers are defined in a linear space rather than a multidimensional space. When needed, the threads may be configured to execute critical sections of code based on the logical identifiers. When the logical identifiers are used by each thread to index into an input work buffer, the threads of a CTA can be executed (via the logical to physical thread mapping) in the work order. Importantly, the logical identifiers for the threads are stored within the SM 310, so even if the processing work is stored outside of the SM 310, the next thread to process in the sequence specified by the logical identifiers can be identified. Then, the processing work for the next thread can be loaded into the SM 310 for processing.

Figure 4:
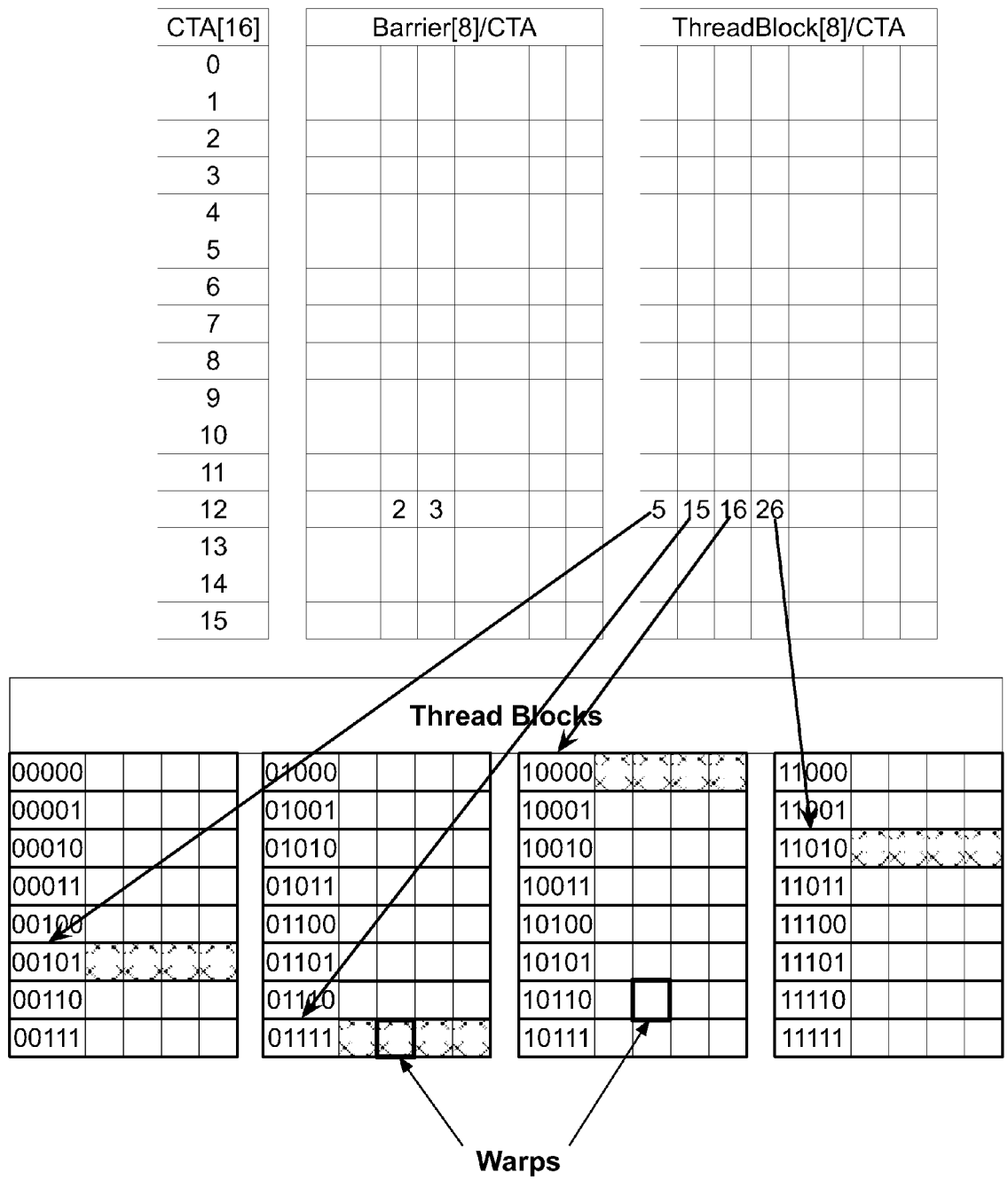
FIG. 4 is a conceptual diagram illustrating thread blocks of a CTA, according to one example embodiment of the present disclosure.

In order to maintain a mapping from logical thread IDs to physical threads, we introduce the concept of a thread block, where each thread block corresponds to a fixed set of physical threads (e.g. 16 threads per block). When launching new work, we allocate physical threads one thread block at a time. This way, we need to maintain the mapping only at per-block granularity, instead of per-thread granularity. FIG. 4 is a conceptual diagram illustrating thread blocks of a CTA, according to one example embodiment of the present disclosure. As shown in FIG. 4, 16 CTAs may be executing within an SM 310 and each CTA can use eight different barriers each having a unique barrier identifier. A barrier may include "top" and "bottom" barrier instructions to define the start and end of a critical code section within a program. A simpler barrier includes only a "top" barrier instruction. In one embodiment, the program counter of the "top" barrier instruction is appended to a barrier identifier as a tag to allow the same barrier identifier to be used in multiple places in a single program. The program counter uniquely discriminates between different barriers when the same barrier identifier appears more than once in the program. In another embodiment, an incrementing counter is used to generate unique barrier identifiers.

Each CTA may be allocated at least one thread block, where a thread block includes 16 threads. As shown in FIG. 4, in one embodiment, the maximum number of thread blocks that may be allocated to a CTA is eight. In another embodiment, a thread block includes 64 threads and each CTA may include 512 or more threads. Sixteen warps are reserved for processing the thread blocks, where each warp includes 4 threads. Therefore, each thread block is a group of 64 threads having resources that are allocated together. As shown in FIG. 4, 128 warps may be simultaneously processed by an SM 310 and the four thread blocks may be distributed to different execution units 302 for load balancing across the different execution units 302. In other embodiments, different numbers of threads may be included in a CTA and a thread block may include a different number of threads.

Given a logical identifier associated with a particular thread, the corresponding thread group that includes the particular thread may be determined. In one embodiment, the thread block is computed by truncating the lowest 4 bits of the logical identifier. The lowest 4 bits of the logical identifier are an offset within the thread block. The physical identifier for the thread is computed by mapping the thread block to a corresponding physical identifier base and then using the offset to locate the processing resources allocated for the thread. For example, the high bits of the physical identifier may be used to determine the thread block and the lower bits may be used to determine the particular thread within the thread block. In sum, the logical identifier is a CTA-oriented identifier for each thread in the CTA and the physical identifier is hardware-oriented identifier for each thread that is executed by the SM 310 for the CTA.

Barrier Instruction Scheduling

Figure 5A:
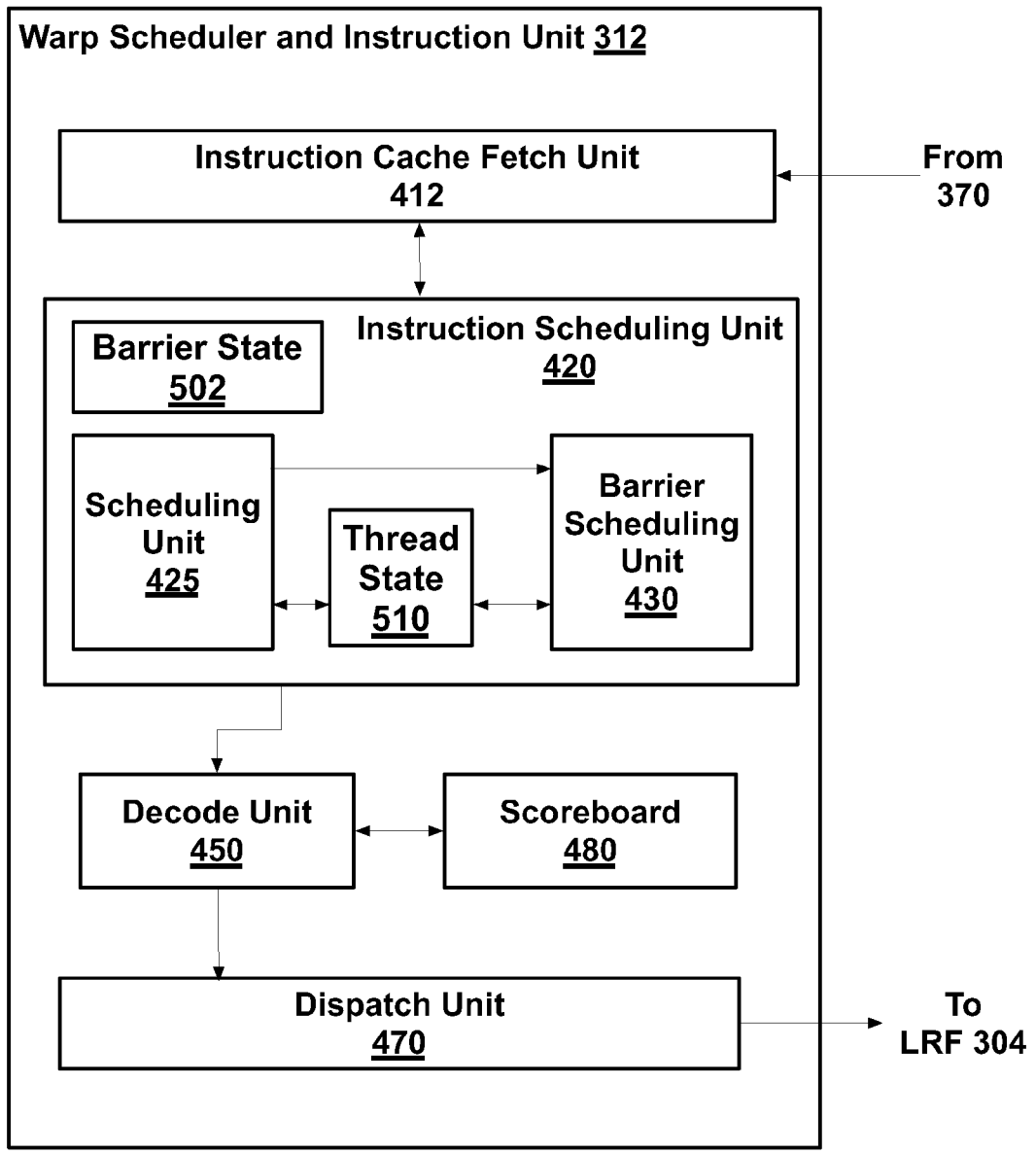
FIG. 5A is a block diagram of the warp scheduler and instruction unit of FIG. 3C, according to one example embodiment of the present disclosure.

FIG. 5A is a block diagram of the warp scheduler and instruction unit 312 of FIG. 3C, according to one example embodiment of the present disclosure. As shown in FIG. 5A, the warp scheduler and instruction unit 312 includes an instruction cache fetch unit 412 that is configured to fetch cache lines containing the instructions for warps from the instruction L1 cache 370. In one embodiment, each cache line is 512 bits wide, storing eight instructions (64 bits wide) in a single cache line. The instruction cache fetch unit 412 outputs the instructions to the instruction scheduling unit 420.

The instruction scheduling unit 420 receives the instructions and warp identifiers and proceeds to schedule the instructions for execution. The instruction scheduling unit 420 may be configured to maintain a priority associated with each of the warps scheduled on SM 310 and schedule the fetched instructions based on the priorities. For example, scheduling unit 425 may maintain a 6-bit or a 10-bit priority value associated with each of 16 different warps scheduled on SM 310 at any given time. The priority may be assigned based on various factors. In one embodiment, priority may be based on when the warp was scheduled on SM 310 (i.e., the longest pending warp may have the highest priority). In other embodiments, the priority may for each warp may be specified by the program that is defined by the instructions executed by the warp or may be based on the CTA.

The instruction scheduling unit 420 includes a scheduling unit 425, a barrier state 502, a thread state 510, and a barrier scheduling unit 430. The scheduling unit 425 does not necessarily select the instructions in the priority order of the different warps because one or more of the instructions may not be ready for execution due to a data dependency or because all of the threads participating in a barrier instruction have not reached a barrier instruction. When a first instruction can be issued, the instruction is scheduled and output by the scheduling unit 425. When the first instruction cannot be issued, the scheduling unit 425 determines if an instruction for a different warp may be issued for the respective instruction. In some cases, the first instruction can be issued, but the first instruction is low priority, so that another instruction (from a different warp) may be issued instead. In all cases, the instructions for each individual thread of a warp are issued in the order that the instructions for the respective individual threads are received by the warp scheduler and instruction unit 312.

The scheduling unit 425 maintains a state model of SM 310 that is updated based on the issued instructions. The state model allows the scheduling unit 425 to select instructions based on dynamic execution of the program and the availability of resources within SM 310. For example, a SM 310 or functional unit within an SM 310 or the texture unit 315 that will execute the instruction may be identified as a resource needed for the instruction and the availability of the resource may be used by the scheduling unit 425.

State information is maintained and used by the scheduling unit 425 and the barrier scheduling unit 430. In particular, state information is needed for barriers and for threads. Barrier state includes one or more of the following fields: a reference count, a rescan flag, a static/dynamic/idle field, and a barrier type (e.g., simple conditional, critical section, ordered critical section). A barrier begins in an idle state. When at least one thread reaches the top barrier instruction, the barrier state changes from idle to static. The scheduling unit 425 changes the state from static to dynamic when the barrier is "ready" to be executed. The barrier scheduling unit 430 changes the state from dynamic to idle when execution of the barrier is "done".

The thread state is stored in thread state 510 and includes one or more of the following fields: barrier identifier, an identifier of the parent CTA, the logical identifier, a done flag, and an awake/asleep flag. The use of the thread state 510 and the barrier state is described in further detail in the following paragraphs.

When the scheduling unit 425 identifies a first occurrence of a particular barrier instruction, meaning that a first thread of a CIA has reached the particular barrier instruction during execution of a program, the scheduling unit 425 updates the state of the barrier identifier specified by the barrier instruction from "idle" to "static" (assuming that the first thread causes an increment of the barrier membership counter that is compared with the reference count). It is not necessary for all threads of a CTA to participate in each barrier that is allocated to a CTA. Each thread that participates in a particular barrier specifies a barrier identifier corresponding to the particular barrier and a thread may participate in one barrier at a time. In one embodiment, threads may indicate participation in a particular barrier using an instruction predicate. Threads that do not participate in a barrier may be scheduled to execute instructions received by the scheduling unit 425. Threads that do participate in a barrier cannot execute instructions that are after the barrier instruction in program order until all of the participating threads have reached the barrier instruction.

The scheduling unit 425 is configured to change the barrier state from static to dynamic when the "membership" for a particular barrier is complete. A variety of different conditions may be used to determine that the membership is complete. A first condition is that the number of threads that have reached the barrier instruction equals the number of threads assigned to the parent CTA. A second condition is that the number of threads that have reached the barrier instruction equals the reference count specified for the barrier. A third condition is that the number of threads that have reached the barrier instruction and that participate in the barrier equals the reference count specified for the barrier. The reference value is specified by the program and indicates the number of threads that are expected to arrive at the barrier. A thread that does not participate in a barrier stores zero for the barrier identifier in the thread state 510. The scheduling unit 425 may be configured to increment a barrier membership counter corresponding to the specific barrier as threads reach the barrier instruction to determine if the membership for the barrier is complete.

As each participating thread reaches the barrier instruction, state data for the thread that is stored in the thread state 510 is updated. Specifically, the thread state is set to "asleep," indicating that the thread is halted (i.e., paused) and is not executing instructions. A thread that has withdrawn is remains "awake" and may continue execution. Once the membership is complete, the scheduling unit 425 changes the state of the barrier identifier to "dynamic" and outputs the CTA identifier and the barrier identifier to the barrier scheduling unit 430. The barrier scheduling unit 430 is configured to schedule threads participating in barrier instructions for execution.

Barrier instructions may be used to delineate ordered and non-ordered critical code sections of a program. A top barrier instruction occurs immediately prior to the first instruction of a critical code section and a bottom barrier instruction having the some barrier identifier as the top barrier instruction occurs immediately after the last instruction of the critical code section. TABLE 1 illustrates an example of an ordered critical code section.

TABLE 1

| | |
|---|---|
| BARRIER.TOP.OCS | // start ordered critical section |
| LD R0, [address]; | // load CTA counter into R0, for local work |
| IMAD R2, R0, R1, R3; | // increment using thread values |
| ST [address], R2 | // store the CTA counter from R2 to memory |
| BARRIER.BOT.OCS; | // finish the ordered critical section |

Barrier instructions may also be used to delineate critical code sections that do not have order constraints, i.e., non-ordered critical code sections. Non-ordered critical code sections may be scheduled by the barrier scheduling unit 430 in an arbitrary order or the logical identifiers may be used to schedule the critical code sections in the logical identifier order, just as ordered critical code sections are scheduled. The barrier scheduling unit 430 will only schedule the (ordered and non-ordered) critical code sections for execution by the threads that participate in the barrier. In one embodiment, a barrier instruction does not delineate a critical code section and is used as a (simple) conditional barrier to synchronize execution of participating threads at a barrier instruction. In other words, instead of a top and bottom barrier, there is just a single barrier instruction.

The barrier scheduling unit 430 schedules the threads that participate in a barrier by waking up a first thread, where the first thread is the participating thread having the lowest logical identifier value (unless a different ordering convention is used). The barrier scheduling unit 430 updates the thread state 510 to indicate that the first thread is awake. Consequently, the scheduling unit 425 will schedule the first thread for execution because the first thread is now eligible to be executed. When the first thread reaches the bottom barrier, the barrier scheduling unit 430 is notified by the scheduling unit 425 and the thread state 510 is updated by either the barrier scheduling unit 430 or the scheduling unit 425 to indicate that the first thread is asleep. When the first thread reaches the bottom barrier, the done flag in the thread state 510 is also updated by either the barrier scheduling unit 430 or the scheduling unit 425 to indicate that the first thread is done.

The barrier scheduling unit 430 then wakes up the next participating thread, enabling execution of the critical code section for the next participating thread. The barrier scheduling unit 430 continues to wake each participating thread in logical order until the last participating thread reaches the bottom barrier. When the last participating thread reaches the bottom barrier, execution of the barrier is complete and the barrier scheduling unit 430 updates the thread state 510 to indicate that all of the participating threads are awake. The barrier scheduling unit 430 may determine that the last participating thread has been scheduled when the search for a next participating thread fails. The scheduling unit 425 updates the barrier state 502 to indicate that the barrier identifier is "idle", e.g., neither "static" nor "dynamic". The scheduling unit 425 is then able to schedule one or more of the participating threads for execution in any order.

Indexed Barrier Instruction Scheduling

In some cases, the threads that participate in the barrier do not need to be executed serially. In other words, sub-groups of the participating threads may be executed in parallel. Within each sub-group the threads are executed serially. One technique for improving performance is to assign each sub-group to a different barrier identifier so that the different sub-groups may be executed in parallel. A single barrier identifier may be referenced by each of the participating threads so that the participating threads are synchronized before the different sub-groups begin executing in parallel. As previously explained, a reference count is specified for each barrier. Oftentimes, the number of threads in each sub-group cannot necessarily be easily determined. Thus, using a different barrier identifier for each sub-group may not be a practical technique to enable parallel execution. Instead an indexed barrier instruction, as described further herein, may be used to enable parallel execution of sub-groups of at least one thread, where each thread participates in the same indexed barrier.

Indexed barrier instructions separate the barrier identifier into two (or more) fields, where a first field specifies a barrier identifier associated with the reference count and a second field specifies a sub-barrier index. For example, a 6 bit name space may be split into a 4.2 format, where 4 bits specify the primary barrier identifier and 2 bits specify a sub-barrier index, allowing for 16 different primary barriers that each can each include 4 different sub-barriers. Thus, each of the 16 primary barriers can support up to 4-way parallelism. The sub-barrier index differentiates between the different sub-groups of the participating threads and may be stored in a per-thread register. The primary barrier identifier may be provided as an opcode field. In one embodiment, both the primary barrier identifier and the sub-barrier index are stored in a per-thread register, with the sub-barrier index residing in the lower bits of the register.

During execution, once the participating threads are synchronized at the indexed barrier, the different sub-groups may execute in parallel. However, within each sub-group of threads specifying the same sub-barrier identifier the participating threads are executed serially. At any point in time following synchronization for the indexed barrier, one thread belonging to each of the different sub-barriers may selected for execution at a time, and the selected threads may be executed in parallel so that two or more threads participating in the indexed barrier may be executed in parallel. In one embodiment, four threads may be executed in parallel. In one embodiment, groups of threads that are known to be able to execute in parallel, such as the four threads of a pixel quad (e.g., 2×2, 1×4, or 4×1 pixels), may be controlled and executed instead of single threads.

Separate reference counts are not needed for each of the sub-barrier identifiers. In some cases computing a reference count for each of the sub-barrier identifiers may be difficult because the number of threads that should reach the sub-barrier is unknown. Therefore, the ability to use an indexed barrier that specifies a reference count for multiple sub-groups enables the parallel execution of each sub-group without computing a reference count for each sub-group. In contrast, using a separate (non-indexed) barrier for each sub-group, so that the sub-groups may be executed in parallel requires specifying a reference count for each of the sub-groups.

Figure 5B:
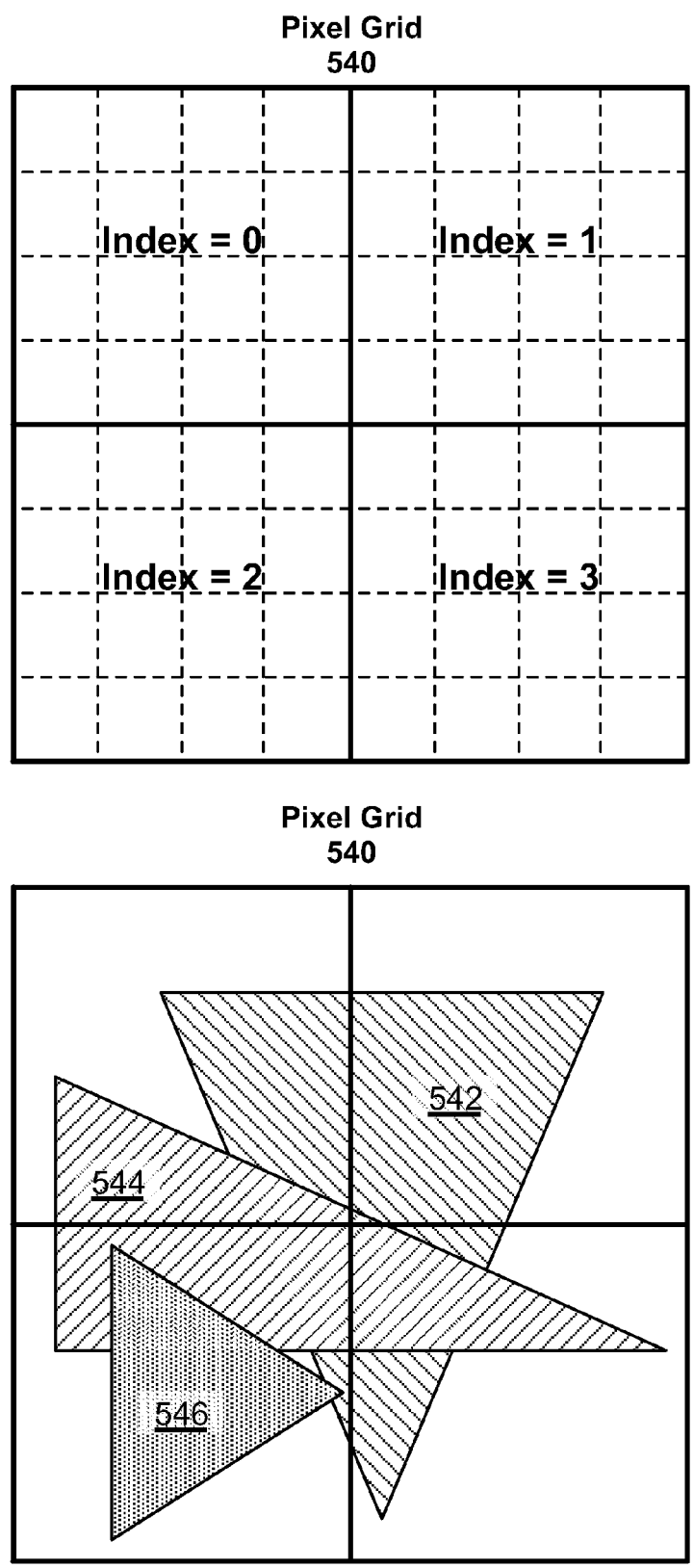
FIG. 5B is a conceptual diagram mapping sub-barrier indexes to a pixel grid that is intersected by multiple graphics primitives, according to one example embodiment of the present disclosure.

FIG. 5B is a conceptual diagram mapping sub-barrier indexes to a pixel grid 540 that is intersected by multiple graphics primitives, according to one example embodiment of the present disclosure. The pixel grid 540 is an 8×8 grid which is further divided into four regions of 4×4 pixels. In other embodiments, each region includes one or more pixels of adjacent or non-adjacent pixels in the pixel grid 540. An ordered critical code section may be configured to perform hidden surface removal (i.e. z buffering or depth testing). When performing hidden surface removal the graphics primitives that intersect the pixel grid 540 should be processed in the same order for each pixel to avoid producing visual artifacts. As shown in FIG. 5B, three primitives 542, 544, and 546 intersect the pixel grid 540. Assuming that the three primitives 542, 544, and 546 are at the same depth, changing the order in which the primitives are processed during hidden surface removal may produce different images.

TABLE 2 illustrates an example of an ordered critical code section that may be used to implement a hidden surface removal operation.

TABLE 2

| | |
|---|---|
| BARRIER.TOP.OCS.IDX BAR_03, R8 | // start ordered critical section |
| LD R0, [pixel_z address]; | // load pixel depth from the frame buffer into R0 |
| MATH R2, R0, prim_pixel_z; | // compare the computed primitive depth with R0 |
| ST R2, [pixel_z address] | // store the result into the frame buffer |
| BARRIER.BOT; | // finish the ordered critical section |

The barrier, BARRIER.TOP.OCS.IDX is configured to use 4 different indexes, 0, 1, 2, and 3 that are mapped to different 4×4 pixel regions of the pixel grid 540, as shown in FIG. 5B. BAR_03 is the barrier identifier and R8 is an input register containing an index.

Threads are allocated to process each pixel, and, as each participating thread arrives at the BARRIER.TOP.OCS.IDX the count of threads that have reached the indexed barrier is incremented and the thread state 510 for the participating thread is set to "asleep". In one embodiment, the reference count and barrier information state indicating the count of participating threads that have reached the barrier is maintained in the barrier state 502 for the barrier identifier having the first field set to the primary barrier identifier and the sub-barrier index set to 0.

Assuming an 8 bit, 6.2 format barrier identifier (6 bit primary barrier identifier and 2 bit index field), where the primary barrier identifier equals 3 (000011 in binary format), the reference count is specified for the barrier identifier 0x3<<2 (00001100 in binary format), assuming a 2 bit sub-barrier index. When the primary barrier identifier is combined with the 2 bit sub-barrier indexes, the barrier identifiers 00001100, 00001101, 00001110, and 00001111 (i.e., 12, 13, 14, and 15 in decimal format) are produced so that a unique barrier identifier corresponds to each of the sub-barrier indexes. In another embodiment, the sub-barrier indexes may correspond to pixel screen coordinates. For example, the low 2 bits of (x,y) pixel coordinates may be used to specify a 4 bit sub-barrier index, where sub-barrier index=((pixel.y & 3)<<2)|(pixel.x & 3).

From the point-of-view of the barrier scheduling unit 430, an indexed bather with a 2-bit sub barrier index field corresponds to four different barriers, where a different sub-group is associated with each of the different barriers. Therefore, the barrier scheduling unit 430 can schedule the sub-groups for execution in parallel while the threads within each sub-group are executed serially. Once all of the threads participating in the indexed barrier reach the indexed barrier (i.e., when the count equals the reference count) the scheduling unit 425 changes the state of the four barrier identifiers to "dynamic" and outputs the CTA identifier and the barrier identifiers to the barrier scheduling unit 430. To enable parallel execution of the sub-groups, a separate barrier identifier is output by the scheduling unit 425 to the barrier scheduling unit 430 for each sub-barrier index that is specified by at least one of the participating threads. Sub-barriers may be controlled as a sub-group by masking out the sub-barrier index for the overall barrier name. This allows the scheduler unit 425 to, for example, wait for all sub-barriers to be executed before releasing any of the sub-barriers.

When the same pixel location occurs more than once in a sub-group of participating threads, the corresponding threads will by executed as a part of the same sub-group in logical order which is the input order (i.e., the order in which the primitives 542, 544, and 546 were received). When the last participating thread in a particular sub-group reaches the bottom barrier, the barrier scheduling unit 430 updates the thread state 510 to indicate that all of the participating threads in the particular sub-group are "awake". The barrier scheduling unit 430 also updates the barrier state 502 for the particular barrier identifier corresponding to the sub-group from "dynamic" to "idle" (i.e., neither "static" nor "dynamic"). When all of the participating threads in the different sub-groups have been scheduled, the scheduling unit 425 will have updated the barrier state 502 to indicate that the four bather identifiers (e.g., 12, 13, 14, and 15) are "idle" (i.e., neither "static" nor "dynamic"). The scheduling unit 425 is then able to schedule one or more of the participating threads for execution in any order.

The barrier scheduling unit 430 may also be configured to schedule exclusive critical code sections and ordered critical code sections with a non-blocking bottom barrier (indexed or non-indexed). The barrier scheduling unit 430 schedules a first thread participating in an exclusive critical code section by first waiting for execution of any other critical code sections or exclusive critical code sections to complete. The barrier for an exclusive critical code section is scheduled for exclusive execution. An exclusive critical code section may be an ordered critical code section or a non-ordered critical code section that is exclusive. Note, that threads that are not participating in a barrier may be executed simultaneously with the threads executing the exclusive critical code section. An exclusive critical code section may be used when resource access conflicts may occur between the threads participating in different barriers.

The barrier scheduling unit 430 schedules threads participating in a critical code section with a non-blocking bottom barrier by allowing the threads to continue execution of subsequent instructions that are immediately after the bottom barrier without waiting for all of the participating threads to execute the critical code section. Once the thread state 510 for a participating thread is updated by the barrier scheduling unit 430 to indicate that the thread is awake, the thread remains awake after reaching the bottom barrier. The scheduling unit 425 is then able to schedule participating threads that have completed execution of the critical code section for execution simultaneously with one other participating thread (in each sub-group for an indexed barrier) that is currently executing the critical code section. When all of the participating threads have reached the bottom barrier, execution of the barrier is complete and the barrier scheduling unit 430 updates the barrier state 502 to indicate that the barrier identifier (or barrier identifiers for an indexed barrier) is neither "static" nor "dynamic".

In one embodiment, the scheduling unit 425 performs a dynamic barrier scoreboard check to determine whether a first instruction can be issued before outputting the first instruction to the decode unit 450. When the first instruction is associated with a barrier identifier, the scheduling unit 425 waits to issue the first instruction in the following situations: when a barrier (in a static or dynamic state) has the same barrier identifier and a different tag compared with the first instruction or when a barrier (in the dynamic state) has the same identifier and the some tag.

Decode unit 450 receives the next instruction to be dispatched from the instruction scheduling unit 420. The decode unit 450 performs a full decode of the instruction and transmits the decoded instruction to the dispatch unit 470. Again, in some embodiments, instructions may be dual or quad issued and decode unit 450 may implement separate decode logic for each issued instruction. Dispatch unit 470 implements a FIFO and writes the decoded values to local register file 304 for execution by execution units 302 or load/store units 303. In embodiments that issue multiple instructions simultaneously, dispatch unit 470 may issue each instruction to a different portion of the functional units of SM 310. Scoreboard unit 480 manages and tracks the number of instructions that have been decoded and dispatched per thread group.

In some cases, it is not necessary for all of the participating threads to reach the barrier instruction before some of the threads begin executing a non-ordered critical code section. For example, a barrier may function as a "speed bump" to encourage grouping of some threads while not requiring the threads to wait for all threads that participate in the barrier to reach the barrier. Therefore, at least a portion of threads expected to have localized memory access patterns may be grouped for improved cache access performance. An indexed barrier may be used to execute code that is non-ordered critical when a sub-barrier index is dynamically generated for different versions of the barrier by the scheduling unit 425.

The scheduling unit 425 may be configured to transition an indexed barrier into the "dynamic" state and generate a "version" of the barrier without necessarily waiting for all of the threads that participate in the barrier to reach the indexed barrier instruction. Each indexed barrier may specify whether versioning is enabled for the barrier. A timeout (i.e., maximum duration of time) may be specified for barriers that are used to control when a new sub-barrier index is generated to create a new version of the barrier. The timeout is measured from the first participating thread to reach the barrier or from the most recent participating thread to reach the barrier. In one embodiment, the scheduling unit 425 may wait for a minimum number of participating threads to reach the indexed barrier before generating a new sub-barrier index for a sub-group of the participating threads. The timeout and/or the minimum number of participating threads are version generation conditions.

When versioning is enabled for a indexed barrier and the version generation condition is met, the scheduling unit 425 transitions the barrier identifier corresponding to the generated sub-barrier index from the "static" to "dynamic" state and sets the sub-barrier index that is referenced by each thread in the version sub-group to the sub-barrier index. When a versioned indexed barrier is used, the indexes are no longer controlled by the user provided index register (e.g., input register R8 shown in Table 2), but are instead generated by the scheduling unit 425 in a serial fashion. The indexed barrier is thereby processed without waiting for all of the participating threads to reach the barrier. The sub-barrier index is initialized at 0 and is incremented (modulo the index count) for each version that is generated. Because the number of unique sub-barrier indexes is limited, the scheduling unit 425 may need to wait for a sub-group corresponding to a previously generated version to complete execution (i.e., transition from "dynamic" to "idle") before reusing the sub-barrier index to generate another version. Execution of the sub-groups (i.e., versions) may be performed in parallel for each sub-barrier index. When the count equals the reference count, the last version will be generated, and when all of the participating threads are executed, execution of the indexed barrier is complete.

Figure 5C:
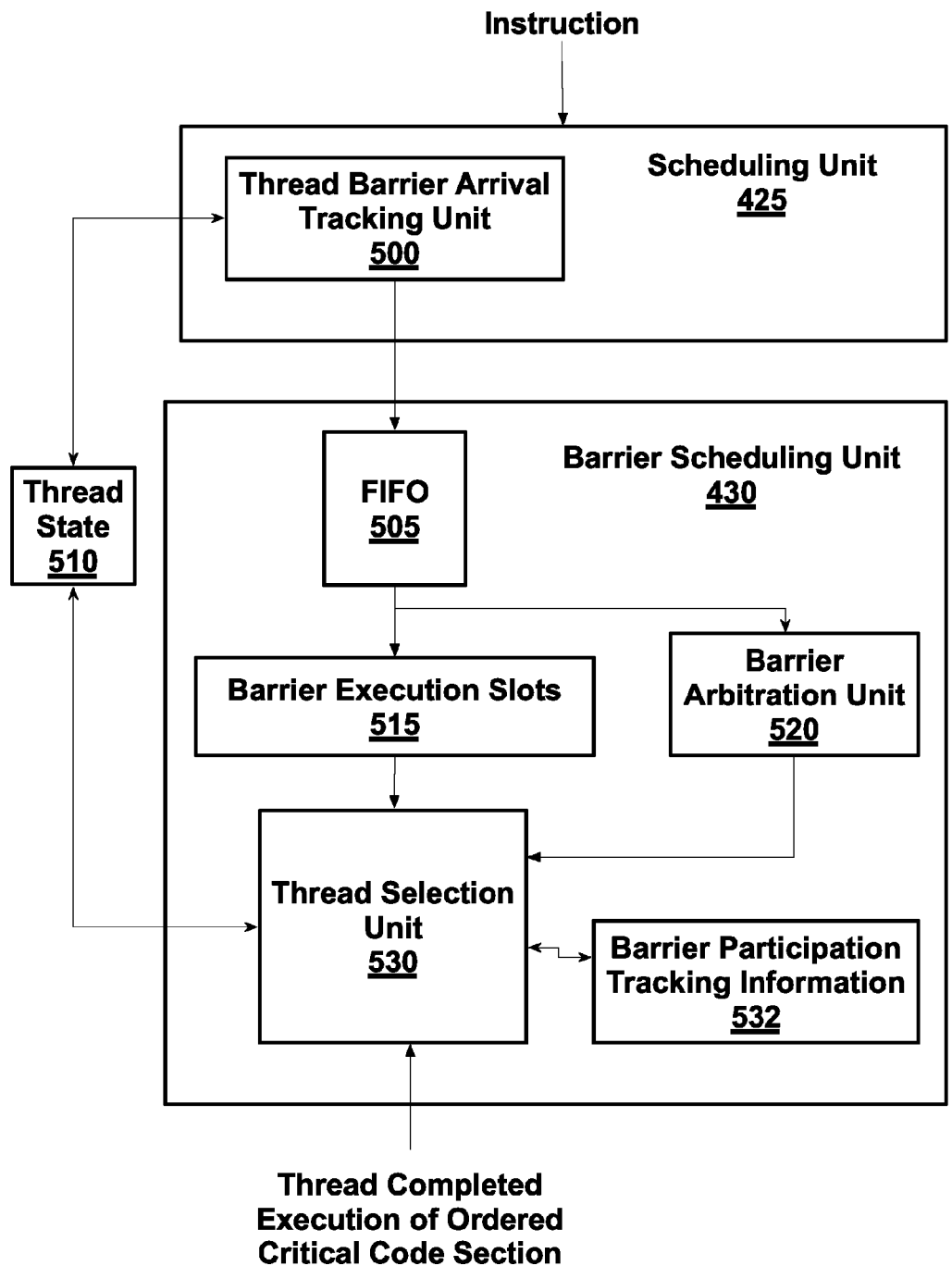
FIG. 5C is a block diagram of a portion of the scheduling unit and the barrier scheduling unit of FIG. 5A, according to one example embodiment of the present disclosure.

FIG. 5C is a block diagram of a portion of the scheduling unit 425 and the barrier scheduling unit 430 of FIG. 5A, according to one example embodiment of the present disclosure. A thread barrier arrival tracking unit 500 updates the barrier state information stored in the barrier state 502 for each barrier that is allocated to a CTA. As previously explained, the barrier state information indicates which barrier identifiers are "static", "dynamic", or idle (neither "static" nor "dynamic"). When a barrier identifier transitions from "static" to "dynamic", the barrier identifier and CTA identifier is output to the FIFO 505. If the barrier is an indexed barrier and the scheduling unit 425 is not configured to generate versions, a barrier identifier with the same primary barrier identifier is output once for each unique sub-barrier index. When the scheduling unit 425 is configured to generate versions for an indexed barrier, the barrier identifier for the sub-barrier index corresponding to the version is output when the version is generated and the sub-barrier index may be recycled if the number of versions is greater than the number of unique sub-barrier indexes and the version is idle. As each thread of the CTA that participates in the barrier reaches the barrier instruction, the scheduling unit 425 updates the state of the participating thread that is stored in the thread state 510 to indicate that the participating thread is "asleep".

The FIFO 505 buffers dynamic barriers when an execution slot is not available in the barrier execution slots 515. In one embodiment, the barrier execution slots 515 includes 16 slots that may each be occupied by one dynamic barrier. When a slot is available in the barrier execution slots 515, a dynamic barrier is popped from the FIFO 505 and inserted into the slot. The barrier arbitration unit 520 arbitrates between the different dynamic barriers that occupy the slots of the barrier execution slots 515. Various priority schemes may be employed by the barrier arbitration unit 520 to arbitrate between the different dynamic barriers. The barrier arbitration unit 520 provides the thread selection unit 530 with a dynamic barrier from which a thread may be selected for scheduling by the thread selection unit 530.

The thread selection unit 530 selects threads in the order specified by the logical identifier associated with each thread in a thread array (i.e., allocated to a CTA). The thread selection unit 530 accesses the barrier participation tracking information 532 to determine which threads participate in the dynamic barrier. The thread selection unit 530 accesses the thread state 510 and the barrier state information stored in the barrier state 502 to identify any late arriving participating threads.

Not all threads in the one or more thread blocks that are allocated to a CTA necessarily participate in each barrier that is used by the CTA. As previously explained, the barriers are specified by barrier identifiers and each thread indicates whether or not it participates in one or more of the indexed barriers by referencing the primary barrier identifier corresponding to an indexed barrier. The thread selection unit 530 identifies the participating threads once for each sub-group during processing of the indexed barrier and then proceeds to select each participating thread having the same sub-barrier index for execution serially. The thread selection unit 530 skips over non-participating threads during the selection process.

Before selecting a first thread for execution for a particular barrier, the thread selection unit 530 determines if the barrier is an exclusive barrier that delineates an exclusive critical code section. If the barrier is exclusive, then the thread selection unit 530 determines if any other thread arrays are executing a critical code section or exclusive critical code section, and, if so, the thread selection unit 530 waits until threads in those thread arrays complete execution before selecting a first thread for execution for the exclusive barrier. In one embodiment, the FIFO 505 does not pop an exclusive barrier while a dynamic barrier occupies a slot in the barrier execution slots 515 and the FIFO 505 does not pop a barrier while an exclusive barrier occupies a slot in the barrier execution slots 515.

The thread selection unit 530 may generate an execution mask based on the participating threads for each sub-group. Participating threads specify the barrier identifier that matches the barrier identifier provided with the barrier instruction. The thread selection unit 530 searches the execution mask to find the first thread, in logical identifier order, to select for execution until all of the threads in the sub-group have been selected. As each participating thread is selected, the bit of the execution mask corresponding to the participating thread is cleared and the thread is marked as done. In one embodiment, when multiple thread blocks are allocated to a CTA, the thread selection unit 530 generates an execution mask for one thread block at a time, thereby limiting the number of bits in the execution mask to the number of threads in a thread block.

When the thread selection unit 530 selects a participating thread for execution, the thread selection unit 530 updates the state of the thread stored in the thread state 510 to indicate that the thread is "awake". The scheduling unit 425 will then issue the thread for execution and continue to issue the thread for each instruction in the critical code section until the barrier bottom is reached. When the bottom barrier is reached, the scheduling unit 425 informs the thread selection unit 530 and the thread selection unit 530 determines whether the thread is required by the barrier to wait for all other threads participating in the barrier to execute the critical code section before proceeding to execute an instruction that is after the critical code section in program order (i.e., the thread selection unit 530 determines if the bottom barrier is a non-blocking bottom barrier). When the barrier is a non-blocking barrier, the thread selection unit 530 may select a next participating thread for execution without putting the currently selected participating thread to "sleep". Instead, the state of the next participating thread that is stored in the thread state 510 is updated to "awake" and any participating threads that have completed execution of the critical code section continue to execute subsequent instructions of the program in program order. The thread selection unit 530 also sets the respective done flag as each participating thread reaches the bottom barrier.

In one embodiment, barriers are used to ensure that threads for a particular CTA that processes data using the texture unit 315 are performed without allowing threads from a different CTA to intervene. Ensuring that the threads for one CTA are processed by the texture unit 315 together increases the likelihood of cache hits because the texture accesses are localized within a CTA. The texture unit 315 is an example of a shared resource and the barriers may be used to control which threads access a shared resource or a resource that may benefit from locality. While the threads may not need to be executed in a specific order, delineating the texture load instructions which read texture data from memory as exclusive critical code sections provides a mechanism for increasing the likelihood that the texture reads will hit in the L1.5 cache 335. Instructions in exclusive critical code sections that control a specific resource (e.g. the texture unit 315) are able to execute at the same time as critical code sections and/or exclusive critical code sections that do not use the same resource. The barrier execution slots 515 may include a slot dedicated to barrier delineating instructions that are executed by the texture unit 315, or slots for any resources that prefer localized controlled access. Threads that are executed by the texture unit 315 may be scheduled for execution simultaneously with threads that are executed by the execution units 302. Scheduling priority may be specified for the different barrier identifiers and texture load instructions delineated using a barrier instruction may or may not be scheduled with higher priority than other barriers.

Figure 5D:
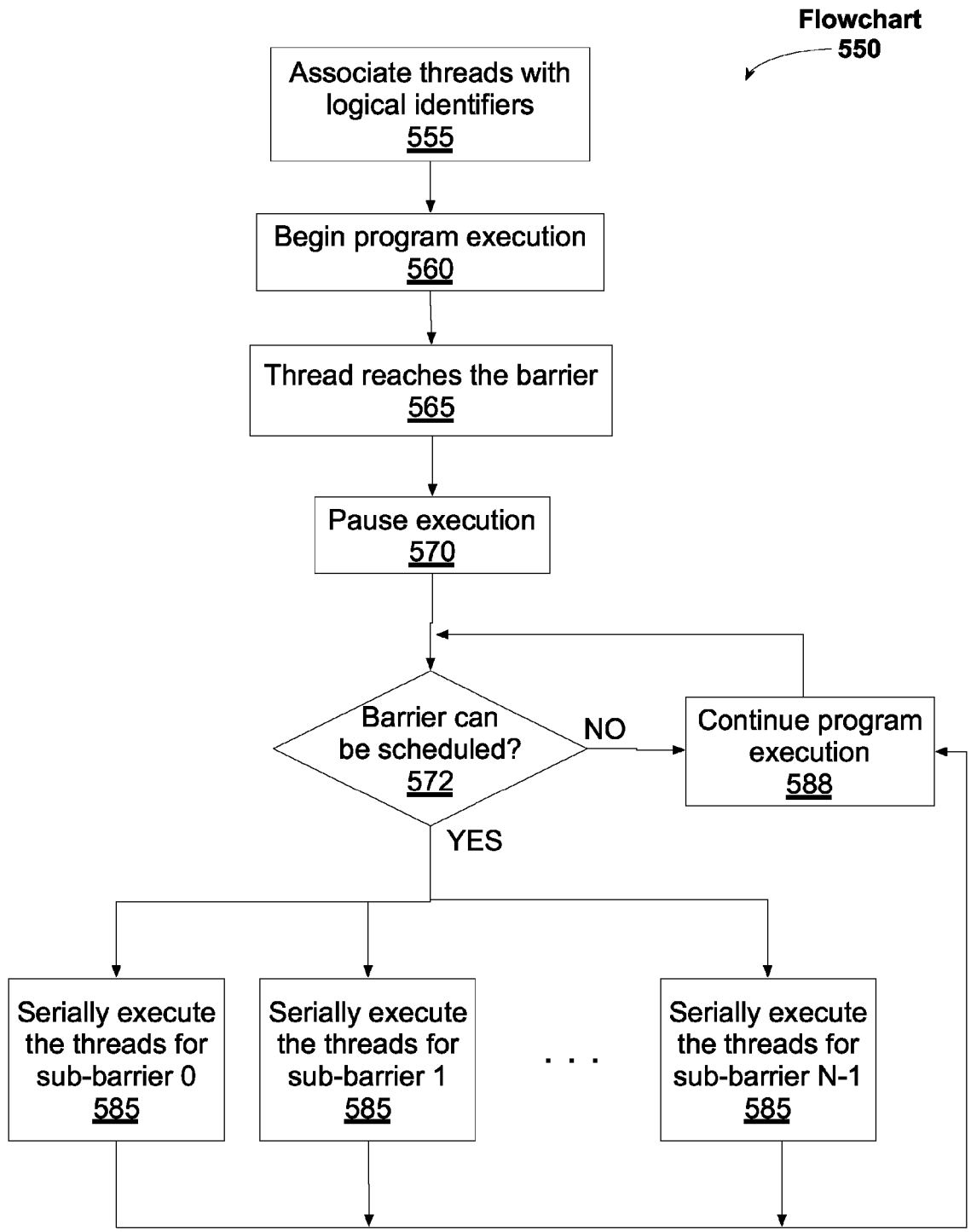
FIG. 5D illustrates a method for scheduling indexed barrier instructions for execution, according to one example embodiment of the present disclosure.

FIG. 5D illustrates a flowchart 550 of a method for scheduling indexed barrier instructions for execution, according to one example embodiment of the present disclosure. As previously described, the sub-barrier index may be specified by a per-thread register or may be dynamically generated by the scheduling unit 425 when a version generation condition is met. Although the method steps are described in conjunction with the systems of FIGS. 1, 2, 3A-3C, 5A, and 5C persons of ordinary skill in the art will understand that any system configured to perform the method steps, in any order, is within the scope of the disclosure.

The method 550 begins at step 555, where the threads allocated to a CTA are associated with logical identifiers. The logical identifiers are mapped to physical identifiers that are referenced by the SMs 310 during execution of the threads. At step 560, program execution is initiated and the scheduling unit 425 receives instructions. For instructions prior to the indexed barrier instruction, the scheduling unit 425 continues execution of the program by outputting the instruction to the decode unit 450. At step 565, at least one thread that participates in the indexed barrier reaches the barrier instruction and, at step 570, execution of the participating thread is paused. The scheduling unit 425 updates the count of threads that have reached the indexed barrier instruction for each participating thread that is paused. When the indexed barrier instruction is reached for the first thread of a CTA, the scheduling unit 425 also updates the state of the primary barrier identifier to indicate that the barrier is "static". When a thread that does not participate in the indexed barrier instruction reaches the indexed barrier instruction, the thread continues execution of the program.

At step 572, the scheduling unit 425 determines if the indexed barrier can be scheduled. If versioning is not enabled, the indexed barrier can be scheduled when all of the participating threads have reached the barrier instruction (i.e., the count equals the reference count). If versioning is enabled, then the indexed barrier can be scheduled when the version generation condition specified for the barrier is met (i.e., a minimum number of participating threads have reached the barrier or a timeout has occurred).

If, at step 572, the scheduling unit 425 determines that the indexed barrier cannot be scheduled, then, at step 588, execution of the program continues. Otherwise, at each one of the parallel steps 585, the critical code section for one thread in a sub-group that corresponds to one of the sub-barrier indexes is executed. The critical code section for the threads in the sub-group may be executed in a serial manner. One or more of the sub-groups may be executed in parallel, as shown in FIG. 5D. When versioning is not enabled, the critical code section may be an ordered critical code section because the indexed barrier is not scheduled until after all of the participating threads have reached the indexed barrier. Versioning should not be enabled for ordered critical code sections because the participating threads may not necessarily be executed in the order of the logical identifiers. When the participating threads in the sub-groups complete execution of the critical code section, program execution continues at step 588.

Figure 6A:
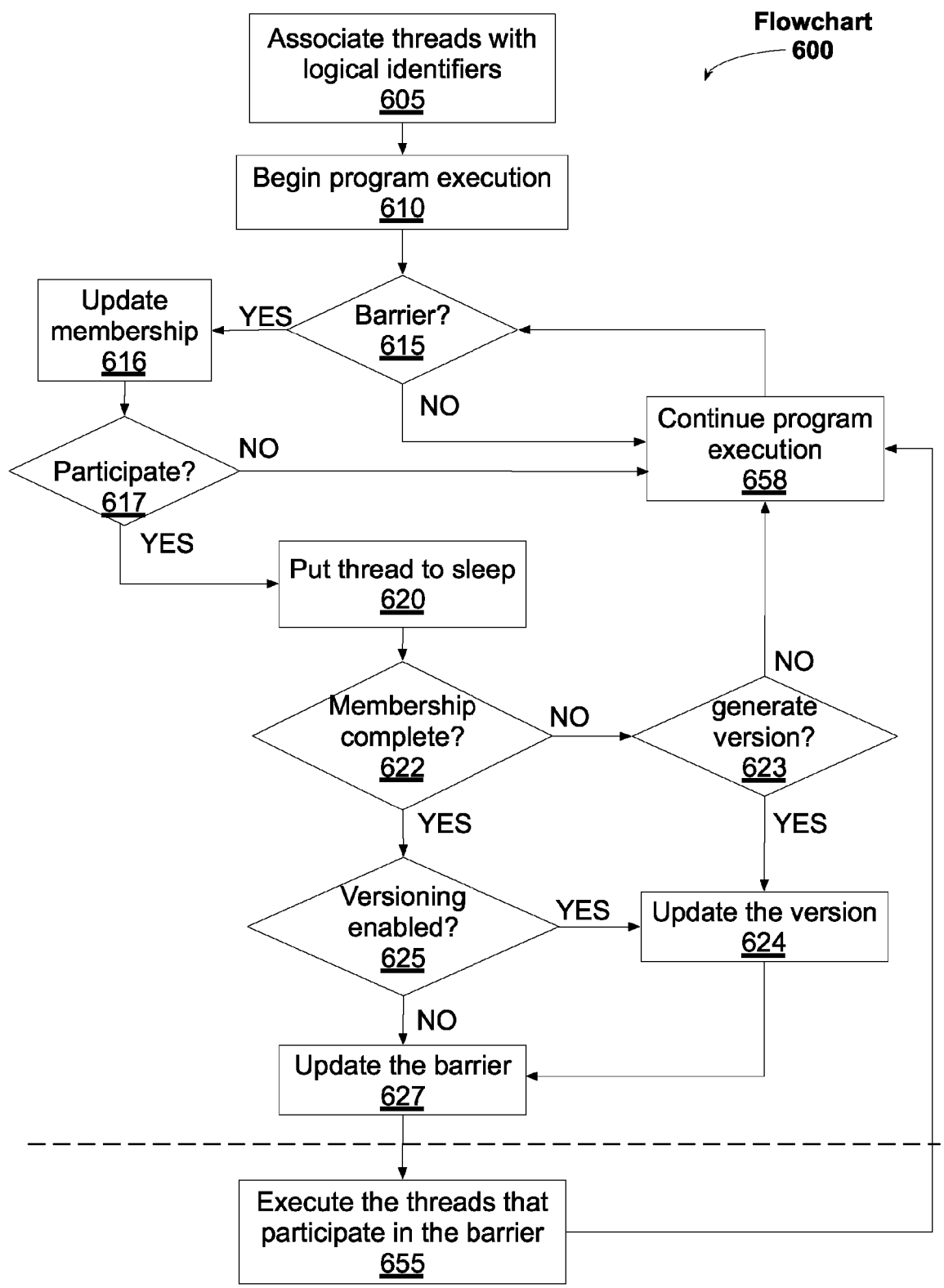
FIG. 6A illustrates a method for scheduling indexed barrier instructions for execution, according to one example embodiment of the present disclosure.

FIG. 6A illustrates a flowchart 600 of a method for scheduling indexed barrier instructions for execution based on logical identifiers, according to one example embodiment of the present disclosure. Although the method steps are described in conjunction with the systems of FIGS. 1, 2, 3A-3C, 5A, and 5C persons of ordinary skill in the art will understand that any system configured to perform the method steps, in any order, is within the scope of the disclosure.

The method 600 begins at step 605, where the threads allocated to a CTA are associated with logical identifiers. The logical identifiers are mapped to physical identifiers that are referenced by the SMs 310 during execution of the threads. At step 610, program execution is initiated and the scheduling unit 425 receives instructions. At step 615, the scheduling unit 425 determines if an instruction is a barrier instruction, and, if not, at step 658, the scheduling unit 425 continues execution of the program by outputting the instruction to the decode unit 450.

If, at step 615, the scheduling unit 425 determines that the instruction is a barrier instruction, and, if so, then at step 616 the scheduling unit 425 updates the barrier membership according to the membership condition that is used for the barrier. When the barrier instruction is reached for the first thread of a CTA, the scheduling unit 425 also updates the state of the barrier to indicate that the barrier is "static" (assuming that the thread causes an increment of the barrier membership counter that is compared with the reference count). Then, at step 617 the scheduling unit 425 determines if the thread participates in the indexed barrier instruction. When the barrier instruction is an indexed barrier instruction the sub-barrier index field of the barrier identifier specified by each thread may be ignored to determine participation. If the thread does not participate in the indexed barrier instruction, then the scheduling unit 425 proceeds to step 658, and the thread continues execution of the program. Otherwise, the thread participates in the indexed barrier instruction, and, at step 620, the scheduling unit 425 updates the state of the thread as "asleep". When an indexed barrier instruction delineates the start of a critical code section (ordered or non-ordered) and versioning is not enabled, the scheduling unit 425 membership condition should require all of the participating threads in the CTA to reach the indexed barrier instruction before allowing any of the participating threads to execute the critical code section.

At step 622 the scheduling unit 425 determines if the membership is complete, according to the variety of different conditions that may be used to determine that the membership is complete. When versioning is enabled for the indexed barrier, the scheduling unit 425 need not wait for all participating threads to reach the barrier instruction before allowing a sub-group of the participating threads to be scheduled for execution. In other words, the scheduling unit 425 does not need to wait for the membership to be complete. If the membership is not complete, then, at step 623, the scheduling unit 425 determines if the version generation condition is met. The version generation condition cannot be met if versioning is not enabled for the indexed barrier. If, at step 623, the version generation condition is not met, then, at step 658, the participating threads that have reached the indexed barrier remain asleep while the scheduling unit 425 continues execution of the program. The version generation condition may be met if version generation is enabled for the indexed barrier and if a timeout has expired or if a minimum number of participating threads have reached the indexed barrier. If, at step 623, the scheduling unit 425 determines that version generation condition is met, then at step 624 the scheduling unit 425 updates the sub-barrier index for the barrier. The scheduling unit 425 provides the target sub-barrier index to each participating thread, no that the thread can save the correct barrier identifier in the thread state 510. Once the participating threads are ready for execution, the barrier identifier+index is sent to the barrier scheduling unit 430, and the index is updated for the next version. If the next index is currently in use, then the scoreboard unit 480 prevents issue until the next index is free. At step 627, the scheduling unit 425 updates the state of the barrier identifier corresponding to the sub-barrier index from "static" to "dynamic" and outputs the barrier identifier and the CTA identifier of the thread to the barrier scheduling unit 430 before proceeding to step 655.

If, at step 622, the scheduling unit 425 determines that the membership is complete, then at step 625 the scheduling unit 425 determines if version generation is enabled. If version generation is enabled, then the scheduling unit 425 proceeds to step 624 to generate the last version for the barrier. Otherwise, at step 627, the scheduling unit 425 updates the state of the barrier identifiers corresponding to the primary barrier identifier from "static" to "dynamic" and outputs the barrier identifiers corresponding to each of the sub-barrier indexes and the CTA identifier of the thread to the barrier scheduling unit 430 before proceeding to step 655.

At step 655, the barrier scheduling unit 430 selects participating threads within each sub-group for serial execution. One thread from each different sub-group may be executed in parallel. When all of the participating threads have completed execution of the critical code section, program execution continues at step 658. Additional details of step 655 are described in conjunction with FIG. 6B. In one embodiment, if a barrier becomes "hung" so that the threads cannot be executed, the barrier can be reset just the same way that invalidated barriers can be reset, i.e., via a special instruction.

In one embodiment, a conditional barrier is used to synchronize execution of participating threads at a barrier instruction, and, at step 620, the thread state for each participating thread is set to asleep and when the membership is complete at step 622, the scheduling unit 425 updates the state of the barrier from "static" to "dynamic" and updates the state of all of the participating threads stored in the thread state 510 to "awake". At step 655, the participating threads then continue execution of the program and the barrier scheduling unit 430 updates the state of the barrier to neither "static" nor "dynamic", i.e., indicating that execution of the barrier is complete for at least a portion of the threads.

Figure 6B:
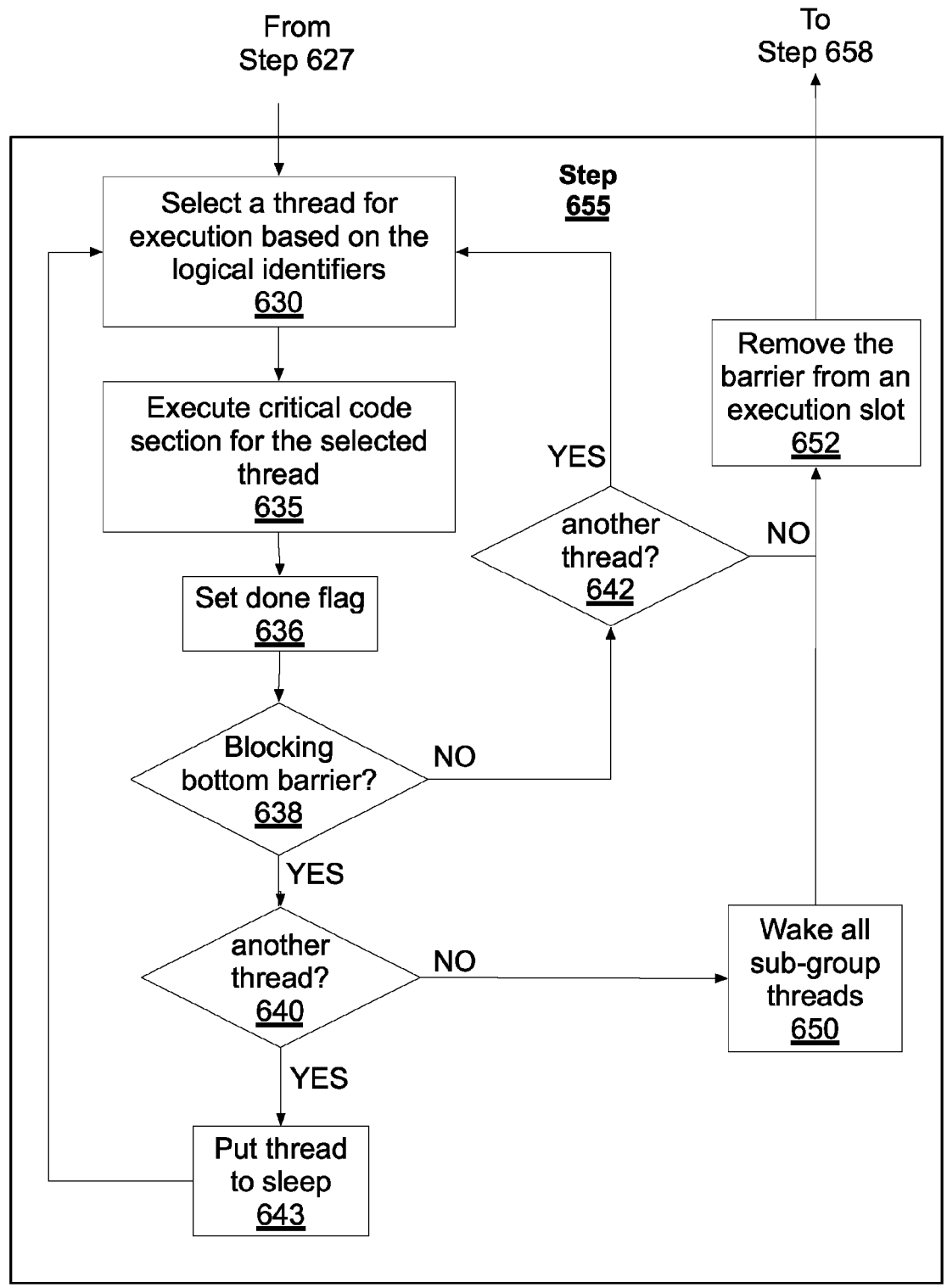
FIG. 6B illustrates a method for performing a step shown in FIG. 6A, according to one example embodiment of the present disclosure.

FIG. 6B illustrates a method for performing step 655 shown in FIG. 6A, according to one example embodiment of the present disclosure. Although the method steps are described in conjunction with the systems of FIGS. 1, 2, 3A-3C, 5A and 5C persons of ordinary skill in the art will understand that any system configured to perform the method steps, in any order, is within the scope of the disclosure.

At step 630, the barrier scheduling unit 430 selects a thread for execution based on the logical identifiers associated with the threads that participate in the barrier. The state of the selected thread is updated from "asleep" to "awake" so that the thread is eligible for execution. Additional details of step 630 are described in conjunction with FIG. 6C. When versioning is enabled, the barrier scheduling unit 430 may select threads for execution out-of-sequence compared with the logical identifiers.

At step 635, the instructions within the critical code section are dispatched by the dispatch unit 470 and are executed for the selected thread. At step 636, the scheduling unit 312 receives the bottom barrier instruction associated with the barrier identifier and the state of the thread is updated to set the done flag. At step 638, the scheduling unit 312 determines if the bottom barrier instruction is a blocking bottom barrier instruction. When, at step 638, the barrier scheduling unit 430 determines that the bottom barrier instruction is blocking, then, at step 640, the barrier scheduling unit 430 determines if another thread that participates in the barrier needs to execute the critical code section. If another thread needs to execute the critical code section, then at step 643, the barrier scheduling unit 430 updates the state of the thread that has reached the bottom barrier instruction is updated from "awake" to "asleep" so that the thread is not eligible for execution. Otherwise, at step 650, the barrier scheduling unit 430 updates the thread state 510 to indicate that all threads in the sub-group are "awake" and the index can be reused. In another embodiment, the barrier scheduling unit 430 does not updates the thread state 510 to indicate that the threads in a sub-group are awake until all of the threads have reached the bottom barrier instruction. At step 652, the barrier scheduling unit 430 removes the barrier identifier (for the sub-group) and CTA identifier from an execution slot in the barrier execution slots 515 updates the state of the barrier identifier to indicate that the indexed barrier is neither "static" nor "dynamic". Note that as each sub-group completes execution, the state of the particular barrier identifier corresponding to the sub-group is updated.

The scheduling unit 425 then proceeds to continue execution of the program. During execution of the critical code section for one CTA barrier, other threads of other barriers of the same CTA, as well as thread barriers of other CTAs, may also continue execution of other code. However, if the barrier is exclusive, only program instructions that are not included within critical code sections may be executed for other barriers.

Figure 6C:
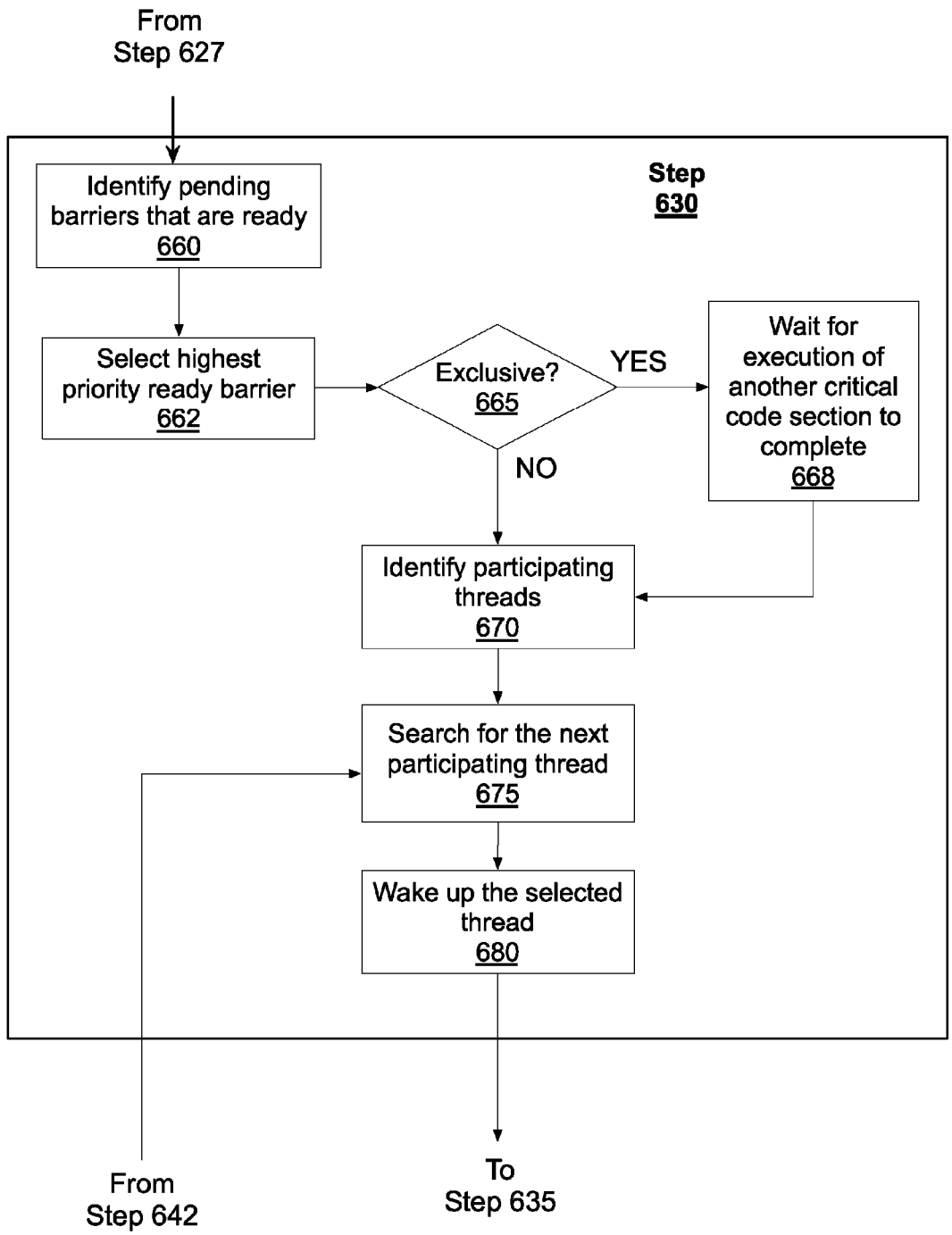
FIG. 6C illustrates a method for performing a step shown in FIG. 6B, according to one example embodiment of the present disclosure.

FIG. 6C illustrates a method for performing step 630 shown in FIG. 6A, according to one example embodiment of the present disclosure. Although the method steps are described in conjunction with the systems of FIGS. 1, 2, 3A-3C, 5A and 5C persons of ordinary skill in the art will understand that any system configured to perform the method steps, in any order, is within the scope of the disclosure.

The step 630 is performed by the barrier scheduling unit 430 for each scheduling cycle. At step 660, the barrier scheduling unit 430 identifies any pending barriers in the barrier execution slots 515 storing a dynamic barrier and having a next thread that can be scheduled. If an exclusive barrier is being executed, then the barrier scheduling unit 430 waits until execution of the exclusive barrier is complete before identifying any pending barriers. At step 662, the barrier scheduling unit 430 selects the highest priority dynamic barrier. At step 665, the barrier scheduling unit 430 determines if the selected dynamic barrier is an exclusive barrier, and, if so, at step 668, the barrier scheduling unit 430 waits until any other barriers delineating (ordered or non-ordered) critical code sections are not being executed by threads before proceeding to step 670. It will be appreciated that the barrier scheduling unit 430 may wait for all participating threads to complete execution of the other critical code section or only wait for threads currently executing to complete execution of the critical code section before (serially) executing the threads participating in the exclusive barrier. It will be appreciated that multiple non-exclusive barriers may be executed in parallel for multiple CTAs, but only one exclusive barrier may be executed at a time.

At step 670, the barrier scheduling unit 430 identifies the threads that participate in the selected barrier by determining whether each thread specifies the barrier by name. At step 675, the barrier scheduling unit 430 searches for the next participating thread by examining the logical identifiers associated with each participating thread that has not yet executed the critical code section. At step 680, the barrier scheduling unit 430 updates the thread state stored in the thread state 510 for the selected participating thread sub-group to indicate that the thread is "awake" before proceeding to step 635. It will be appreciated that step 670 may be performed once, per thread block or once per cycle, to identify the participating threads in the sub-group, because the barrier scheduling unit 430 may be configured to maintain an execution mask for each sub-group. The barrier scheduling unit 430 efficiently wakes up the participating threads in logical order as each previous participating thread completes execution of the critical code section and updates the execution mask for the sub-group. In one embodiment, the execution mask is computed for each thread block.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A method comprising:
  initiating execution of a plurality of threads to process instructions of a program that includes a barrier instruction;
  for each thread in the plurality of threads, pausing execution of instructions when the thread reaches the barrier instruction;

determining that the barrier instruction may be scheduled for execution when either a maximum duration of time has transpired or a minimum number of participating threads that is less than a number of threads that participate in the barrier instruction have reached the barrier instruction;

associating a first sub-group of the threads in the plurality of threads with a first sub-barrier index;

associating a second sub-group of the threads in the plurality of threads with a second sub-barrier index; and executing threads in the first sub-group serially and executing threads in the second sub-group serially, wherein at least one thread in the first sub-group is executed in parallel with at least one thread in the second sub-group.

2. The method of claim 1, further comprising, for each thread in the plurality of threads, determining if the thread participates in the barrier instruction when the thread reaches the barrier instruction during execution of the thread.

3. The method of claim 1, wherein the determining that the barrier instruction may be scheduled for execution comprises determining that a thread arrival count equals a reference count, wherein the thread arrival count is updated when each thread that participates in the barrier instruction reaches the barrier instruction during execution of the thread.

4. The method of claim 3, wherein the reference count equals a number of threads that participate in the barrier instruction.

5. The method of claim 1, further comprising comparing the maximum duration of time to a delay from when a first participating thread in the plurality of threads reached the barrier instruction.

6. The method of claim 1, further comprising comparing the maximum duration of time to a delay from when a most recent participating thread in the plurality of threads reached the barrier instruction.

7. The method of claim 1, further comprising associating the threads with logical identifiers that are mapped to physical identifiers, wherein the physical identifiers are referenced by a multi-threaded processing core during execution of the threads.

8. The method of claim 1, further comprising:
generating a tag based on a program counter or a memory address corresponding to the barrier instruction; and
associating the tag with the barrier instruction.

9. The method of claim 1, wherein the barrier instruction delineates a critical code section.

10. The method of claim 1, wherein each thread specifies a barrier identifier for each barrier instruction for which the thread participates.

11. A method comprising:
initiating execution of a plurality of threads to process instructions of a program that includes a barrier instruction;
for each thread in the plurality of threads, pausing execution of instructions when the thread reaches the barrier instruction;
determining that the barrier instruction may be scheduled for execution;
associating a first sub-group of the threads in the plurality of threads with a first sub-barrier index;
associating a second sub-group of the threads in the plurality of threads with a second sub-barrier index, wherein the first sub-barrier index and the second sub-barrier index are determined based on pixel screen coordinates or memory addresses of content stored corresponding to the pixel screen coordinates; and
executing threads in the first sub-group serially and executing threads in the second sub-group serially, wherein at least one thread in the first sub-group is executed in parallel with at least one thread in the second sub-group.

12. The method of claim 11, wherein the barrier instruction delineates a critical code section.

13. The method of claim 11, wherein each thread specifies a barrier identifier for each barrier instruction for which the thread participates.

14. A processing subsystem comprising:
an instruction scheduling unit, configured to:
initiate execution of a plurality of threads to process instructions of a program that includes a barrier instruction;
for each thread in the plurality of threads, pause execution of instructions when the thread reaches the barrier instruction;
determine that the barrier instruction may be scheduled for execution when either a maximum duration of time has transpired or a minimum number of participating threads that is less than a number of threads that participate in the barrier instruction have reached the barrier instruction;
associate a first sub-group of the threads in the plurality of threads with a first sub-barrier index;
associate a second sub-group of the threads in the plurality of threads with a second sub-barrier index; and
a multi-threaded processing core that is configured to execute threads in the first sub-group serially and execute threads in the second sub-group serially, wherein at least one thread in the first sub-group is executed in parallel with at least one thread in the second sub-group.

15. The processing subsystem of claim 14, wherein the instruction scheduling unit is further configured to, for each thread in the plurality of threads, determine if the thread participates in the barrier instruction when the thread reaches the barrier instruction during execution of the thread.

16. The processing subsystem of claim 14, wherein the instruction scheduling unit is further configured to, prior to determining that the barrier instruction may be scheduled for execution, determine that a thread arrival count equals a reference count, wherein the thread arrival count is updated when each participating thread reaches the barrier instruction during execution of the thread.

17. The processing subsystem of claim 16, wherein the reference count equals a number of threads that participate in the barrier instruction.

18. A processing subsystem comprising:
an instruction scheduling unit, configured to:
initiate execution of a plurality of threads to process instructions of a program that includes a barrier instruction;
for each thread in the plurality of threads, pause execution of instructions when the thread reaches the barrier instruction;
determine that the barrier instruction may be scheduled for execution;
associate a first sub-group of the threads in the plurality of threads with a first sub-barrier index;
associate a second sub-group of the threads in the plurality of threads with a second sub-barrier index, wherein the first sub-barrier index and the second sub-barrier index are determined based on pixel screen coordinates or memory addresses of content stored corresponding to the pixel screen coordinates; and a multi-threaded processing core that is configured to execute threads in the first sub-group serially and execute threads in the second sub-group serially, wherein at least one thread in the first sub-group is executed in parallel with at least one thread in the second sub-group.

19. The processing subsystem of claim 18, wherein the instruction scheduling unit is further configured to, for each thread in the plurality of threads, determine if the thread participates in the barrier instruction when the thread reaches the barrier instruction during execution of the thread.

20. The processing subsystem of claim 18, wherein the reference count equals a number of threads that participate in the barrier instruction.

\* \* \* \* \*

UNITED STATES PATENT AND TRADEMARK OFFICE
CERTIFICATE OF CORRECTION

Page 1 of 1

PATENT NO. : 9,442,755 B2
APPLICATION NO. : 13/844541
DATED : September 13, 2016
INVENTOR(S) : John Erik Lindholm et al.

It is certified that error appears in the above-identified patent and that said Letters Patent is hereby corrected as shown below:

In the Specification

Column 1, Line 67 please replace "to embodiment" with --to one embodiment--;
Column 5, Line 7 please replace "processing duster" with --processing cluster--;
Column 6, Line 26 please replace "LIMA embodiments," with --UMA embodiments,--;
Column 11, Line 47 please replace "310), Shared" with --310). Shared--;
Column 14, Line 36 please replace "a CIA has" with --a CTA has--;
Column 15, Line 23 please replace "some barrier" with --same barrier--;
Column 18, Line 10 please replace "indexed bather" with --indexed barrier--;
Column 18, Line 45 please replace "bather identifiers" with --barrier identifiers--;
Column 19, Line 26 please replace "some tag." with --same tag.--;
Column 23, Line 59 please replace "617 the" with --617, the--;
Column 24, Line 34 please replace "thread, no" with --thread, so--.

In the Claims

Column 27, Line 56-57 Claim 11 please replace "barrier instruction:" with --barrier instruction;--.

Signed and Sealed this
Thirty-first Day of March, 2020

Andrei Iancu
*Director of the United States Patent and Trademark Office*